219-121 SR
1-22-74 XR 3,787,873

United States Patent [19] [11] 3,787,873
Sato et al. [45] Jan. 22, 1974

[54] LASER RECORDING METHOD AND MATERIAL THEREFOR

[75] Inventors: Masamichi Sato; Akira Nabara, both of Asaka, Japan

[73] Assignee: Fuji Photo Film Co., Ltd., Kanagawa, Japan

[22] Filed: Oct. 12, 1971

[21] Appl. No.: 188,066

[30] Foreign Application Priority Data

Oct. 12, 1970 Japan ............................... 45-89563

[52] U.S. Cl. ......... 346/1, 219/121 LM, 340/173 TP, 346/76 L, 346/135

[51] Int. Cl. ........................................... G01d 15/34

[58] Field of Search ............ 346/1, 76 L, 135, 77 E; 340/173 TP; 219/121 L, 121 LM

[56] References Cited

UNITED STATES PATENTS

| | | | |
|---|---|---|---|
| 2,664,043 | 12/1953 | Dalton | 346/135 X |
| 3,689,768 | 9/1972 | Sato et al. | 346/135 X |
| 3,154,371 | 10/1964 | Johnson | 346/108 |
| 3,266,393 | 8/1966 | Chitayat | 346/107 X |
| 3,314,073 | 4/1967 | Becker | 346/76 L |
| 3,410,203 | 11/1968 | Fischbeck | 346/76 L X |
| 3,475,760 | 10/1969 | Carlson | 346/76 L X |

*Primary Examiner*—Joseph W. Hartary
*Attorney, Agent, or Firm*—Sughrue, Rothwell, Mion, Zinn and Macpeak

[57] ABSTRACT

An improved recording method and recording material utilizing a laser beam is disclosed. A transparent method is recorded upon with a laser beam of comparatively little energy by providing the material with a light absorbing, deformation promoting, removable layer having a high absorption coefficient.

6 Claims, 8 Drawing Figures

LASER RECORDING METHOD AND MATERIAL THEREFOR

BACKGROUND OF THE INVENTION

1. Field of the Invention

The present invention relates to a recording method and recording material utilizing a laser beam, and is directed to an improvement of an invention disclosed in Japanese Patent Publication No. 19330/68.

2. Description of the Prior Art

In the invention disclosed in Japanese Patent Publication No. 19330/68 a laser beam is directed onto a recording material, the irradiated area of the recording material is made molten, and the surface is roughed. Therefore, when the recording material is transparent or half-transparent in the disclosed invention, the energy of the laser beam should be great since the absorption of the laser beam is small. In other words, a laser beam of large output is required in the invention disclosed therein. On the other hand, when the recording material is colored and has a large absorption for a laser beam, the energy of the laser beam may be small but it is disadvantageous in that the recorded image is observed with difficulty with a transmitted light. For example, when the recorded image is projected through a slide projector, the image is dark and cannot be put into practical use. It will be understood that such an image recorded on a colored material can be observed by means of a reflecting light.

OBJECTS OF THE INVENTION

The primary object of the present invention is to provide a recording method and material therefor in which a transparent material can be recorded upon with a laser beam of comparatively small energy.

Other objects, features and advantages will be made apparent from the description of the preferred embodiments of the present invention taken in conjunction with the accompanying drawings.

SUMMARY OF THE INVENTION

In accordance with the present invention, there is provided a method of recording comprising preparing a recording material having a light absorbing thin layer on a transparent substratum having a thermoplastic surface, irradiating a laser beam on said light absorbing layer, and removing or reducing the absorption coefficient of said light absorbing thin layer.

DETAILED DESCRIPTION OF THE INVENTION

Figure 2:
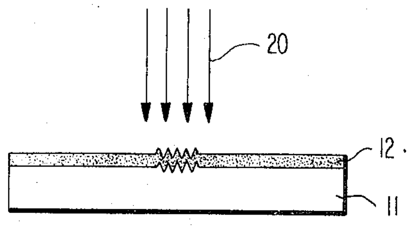
FIG. 2 is a side sectional view of the laser recording material of the present invention which is irradiated by a laser beam.

Now referring to the drawing, the reference numeral 11 in FIG. 2 shows a transparent thermoplastic substratum such as polyethylene, polycarbonate, polystyrene, polyvinyl chloride-vinyl acetate copolymer, polyethylene terephthalate, and the like. The reference numeral 12 indicates a light absorbing thin layer having a high absorption coefficient for a laser beam. The layer 12 should be easily removed or reduced of its light absorption coefficient by a proper method. This point will be described in detail hereinafter.

In FIG. 2 wherein the recording material is irradiated by a laser beam 20, the light absorbing thin layer 12 is heated at the area where it is irradiated by the laser beam 20 and the surface thereof is roughed. At the same time as the surface of the light absorbing layer is roughed, the surface of the substratum 11 is also roughed at the boundary between the two layers.

Figure 1:
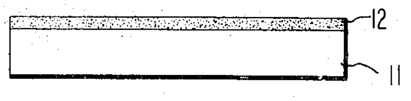
FIG. 1 is an enlarged side sectional view of the recording material used in accordance with the present invention.
Figure 3:
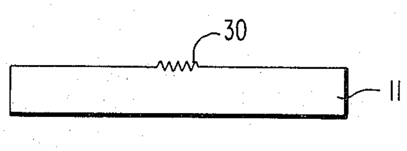
FIG. 3 is a side sectional view of the laser recording material of the present invention which is formed with the recorded image thereof.

As shown in FIG. 3, the light absorbing layer 12 has been removed after irradiation. The area shown at 30 is the area which is irradiated by the laser beam. Since the light absorbing layer has been removed and the area 30 is roughed, an image can be seen when a visible light is projected through the material by a slide projector. The image is a dark image in a bright background. In order to remove the light absorbing layer 12 in FIGS. 1 and 2, a solvent is used to wash away the layer.

Figure 4:
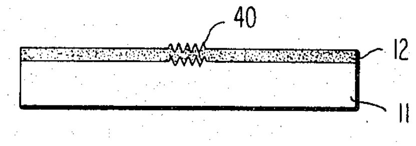
FIG. 4 is an enlarged sectional side view of the laser recording material in accordance with another embodiment of the present invention showing the state wherein the recording material is formed with an image.

In FIG. 4, another embodiment of the material is shown. The area 40 is the area which has been irradiated by the laser beam. In the embodiment shown in FIG. 4, the layer 12 is not removed by the light absorbing coefficient thereof is reduced after irradiation. In this case, a dark image can be seen in a bright background since the light absorbing layer 12 is made almost transparent and colorless. In order to reduce the light absorption of the layer 12, the coloring agent is washed away by means of a solvent. For example, if the layer 12 is made of gelatin colored with dye, the dye can be washed away just by washing with water.

Figure 5:
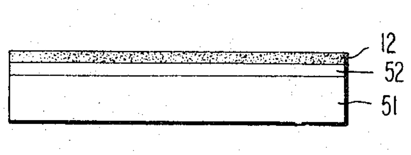
FIG. 5 is an enlarged sectional side view of the laser recording material in accordance with still another embodiment of the present invention.

In FIG. 5, another embodiment of the recording material is shown, wherein the reference numeral 51 indicates a transparent substratum which may not be fusible by a laser beam and then used such as polyethylene, polycarbonate, polyethylene-terephthalate, triacetylcellulose and other plastic film or glass. The reference numeral 52 indicates a transparent thin layer of thermoplastic material such as polystyrene, polyethylene, polyvinyl chloride-vinyl acetate copolymer, styrene-butadiene copolymer and the like. The thickness of the layer 52 is from 2 to 100$\mu$, preferably from 5 to 20$\mu$. The thickness of the light absorbing layer 12 should be from 1 to 10$\mu$ preferably from 1 to 5$\mu$. The light absorption coefficient of the layer 12 is preferred to be not less than $10^3$ $cm^{-1}$. In other words, the light intensity is preferred to be reduced to not more than one thousandth while the light passes by 1 cm.

The light absorbing layer 12 can be made by coating light absorbing powder uniformly on the surface of the substratum. For example, carbon black or other coloring pigment may be coated uniformly on the substratum. Alternatively, soot may be provided on the surface by burning heavy oil. The powder can be removed by a proper method after irradiation by laser beams. For example, the powder may be blown off by compressed air blow, or may be wiped off with a brush, cotton cloth or the like, or may be removed by a solvent.

Instead of a coating powder, a thin layer may be deposited on the surface by vacuum evaporation. For instance, evaporated dye can be washed away with a solvent after irradiation.

Figure 6:
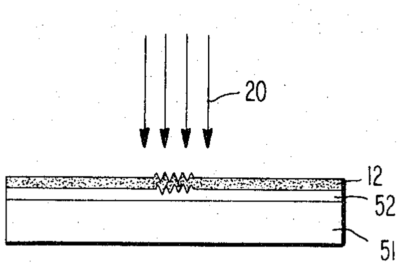
FIG. 6 is an enlarged sectional side view of the laser recording material in accordance with the embodiment shown in FIG. 5 showing the state in which the recording material is irradiated with the laser beam.

In FIG. 6, the recording material shown in FIG. 5 is irradiated with a laser beam 20. The light absorbing layer 12 is well heated by the irradiation of laser beam, and the layer 12 and the layer 52 are roughed by the heat.

Figure 7:
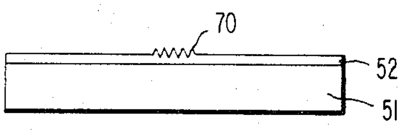
FIG. 7 is an enlarged sectional side view of the laser recording material in accordance with the present invention showing the state wherein it is recorded with an image.
Figure 8:
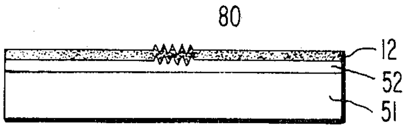
FIG. 8 is an enlarged sectional side view of the laser recording material in accordance with the present invention showing another embodiment thereof wherein the material is formed with an image.

The recording material shown in FIG. 7 represents an embodiment wherein the light absorbing layer is removed. The area 70 shows where the laser beam has been used. In FIG. 8, an embodiment is shown wherein the light absorbing layer 12 is reduced of its light absorption coefficient. It will be understood that the embodiments shown in FIGS. 7 and 8 are representative of the recorded state of the material shown in FIG. 5 recorded in the method as shown in FIG. 6.

When the recording material shown in FIG. 5 is used, it is advantageous that a recording material having a large material strength can be obtained since a thermofusible base may not be used.

In accordance with the present invention, the recording can be accomplished by a laser beam of smaller energy than that of the laser beam required in the conventional recording method and further, an image of higher contrast can be obtained.

Further, if the recording material is irradiated by a laser beam after it has been preheated to a definite temperature, the energy of the laser beam can be further saved.

The laser beam can be irradiated on either the front surface or back surface of the recording material.

EXAMPLE 1

A mixture of polyvinyl acetate and carbon black (with a weight ratio of 1:1) was coated onto a polystyrene film of 100$\mu$ thickness with a coating thickness of 3$\mu$. On this recording material, an argon ion laser (wavelength 5,145A) of output of 0.7 watt concentrated to a beam having a diameter of about 50$\mu$ was directed and scanned at a speed of 8 cm per second. The irradiated area of the recording material was changed to have light diffusing and light transmitting properties. However, the image was very dark when it was projected onto a screen with a slide projector and was impractical. Then, the recording material thus prepared was dipped in methanol to dissolve and remove the light absorbing layer. The image of the material was then projected by a slide projector after drying. A sharp black image was observed in a bright background. Almost the same result was obtained when the laser beam was irradiated from the back of the recording material.

EXAMPLE 2

After irradiating the recording material of Example 1 with a ruby laser beam (wavelength 6,943A) of 0.1 Joule concentrated to a beam having a diameter of 0.1 mm at a scanning rate of 20 m per second, the light absorbing layer was removed by methanol as in Example 1. A sharp linear image of high contrast was obtained in a bright background. Almost the same result was obtained when the laser beam was directed onto the back of the recording material.

Example 3

Polystyrene was coated to a thickness of 15$\mu$ on a base of polyethyleneterephthalate having a thickness of 85$\mu$, and a light absorbing layer used in Example 1 was coated thereon. After directing a laser beam onto the thus prepared recording material as in Examples 1 and 2, the light absorbing layer was removed by the use of methanol as in Example 1. A sharp image was also obtained in a bright background. In this case also, substantially the same result was obtained when the laser beam was directed onto the back of the recording material.

Example 4

Dye and colored gelatin with a thickness when dried of 25$\mu$ was coated onto a polystyrene film of 135$\mu$ thickness. The dye used was Acid Red (C.I. 18050) was added by one part by weight to 100 parts by weight of gelatin. A laser beam was directed onto the thus prepared recording material as in Example 1. Then, the gelatin was dissolved and removed with warm water and the recording material was dried. Thus, a sharp image was obtained.

EXAMPLE 5

0.5 percent formalin was added in the gelatin aqueous solution when the recording material prepared in Example 4 was prepared. The, a laser beam was directed onto the thus prepared recording material as in Example 1, and the recording material was washed with water. Then, gelatin was not dissolved by washing, but the due was removed away. After drying, a sharp image was obtained.

Example 6

Polyvinylchloride-vinyl acetate copolymer was coated to a thickness of 15 $\mu$ on a base of polyethyleneterephthalate of 85$\mu$ thickness. Further thereon, a mixture of Brilliant Carmin 6B and polystyrene (weight ratio 2:1) was coated with thickness of 3$\mu$. A laser beam was also directed onto this recording material as in Example 1. Then, the Brilliant Carmin 6B was dissolved and removed with an aqueous solution of 50 percent acetic acid. After drying, an image of low contrast was obtained in a cloudy background. When this was exposed to benzene vapour, the background was cleared and a sharp image was obtained in a bright background.

Example 7

Powder of Brilliant Carmin 6B was uniformly coated in a thin layer on the surface of a film of polyethylene terephthalate of 100$\mu$ thickness. A laser beam was irradiated onto the thus prepared recording material as in Example 1. Then, the Brilliant Carmin 6B was removed with 50 percent acetic acid aqueous solution. A light diffusing image was obtained in a transparent background.

Example 8

Example 7 was repeated except that carbon black powder was used instead of Brilliant Carmin 6B. A laser beam was directed onto the recording material and the carbon black powder was blown away by the use of an air blower. A black light diffusing image was obtained in a transparent background. Carbon black was fused to the area where the recording material was irradiated by the laser beam.

What is claimed is:

1. A laser recorder method which comprises:

providing a light absorbing deformation promoting removable layer having a high absorption coefficient for a laser beam on a transparent main deformable base having a thermofusible property at least at the surface thereof, recording a laser beam of a power sufficient to deform said base onto said layer thereof, and removing the light absorbing layer.

2. A laser recording method which comprises:

providing a light absorbing deformation promoting removable layer having a high absorption coefficient for a laser beam on a transparent main deformable base having a thermofusible property at least at the surface thereof, recording a laser beam of a power sufficient to deform said base onto said layer thereof, and reducing the absorption coefficient of said light absorbing layer.

3. A laser recording material comprising:

a transparent main deformable base having a thermofusible property at least at the surface thereof, having superimposed thereon, a light absorbing deformation promotion removable layer having a high absorption coefficient for a laser beam, and recorded on to said light absorbing deformation promoting removable layer, a laser beam of a power sufficient to deform said base onto said layer.

4. The laser beam recording material as defined in claim 3 wherein said base is polyethylene terephthalate, said thermofusible layer is polystyrene, and said light absorbing layer is a mixture of carbon black and polyvinyl acetate.

5. The laser beam recording material as defined in claim 3 wherein said light absorbing layer is Brilliant Carmin 6B.

6. The laser beam recording material as defined in claim 3 wherein said base is a polystyrene film and said light absorbing layer is a mixture of carbon black and polyvinyl acetate.

* * * * *